April 5, 1927.     G. F. A. STONE     1,623,563
ELECTRICAL CONDENSER
Filed July 15, 1925

INVENTOR.
George F. A. Stone
By Richards & Geier
Attys

Patented Apr. 5, 1927.

1,623,563

UNITED STATES PATENT OFFICE.

GEORGE FREDERICK AMOS STONE, OF LONDON, ENGLAND.

ELECTRICAL CONDENSER.

Application filed July 15, 1925, Serial No. 43,682, and in Great Britain August 1, 1924.

This invention relates to electrical condensers for use primarily, but not exclusively, in connection with wireless telegraphy and the like.

In devices of this description it is desirable, if not essential, for satisfactory operation that the condenser, plates and dielectrics should be firmly and rigidly clamped together, variation in the area of the effective engagement between the elements of the condenser during operation producing, for a given number of such elements, variation in capacity of the condenser as a whole.

In order to overcome this disadvantage it has been proposed to secure the condenser plates and dielectrics together by bolts or rods passing through the elements, suitable nuts or other fastening devices co-operating with the bolts to force and maintain the elements of the condenser in efficient relation to each other.

The object of the present invention, which contemplates the use of securing devices of this general nature, is to provide an electrical condenser which shall permit of the necessary close engagement of the elements of the condenser, but which at the same time shall enable the capacity of the condenser to be readily varied by a simple operation permitting the removal or addition of elements necessary to obtain such adjustment.

Figure 1:
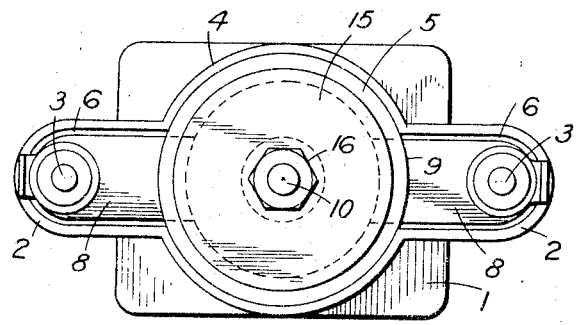
Figure 2:
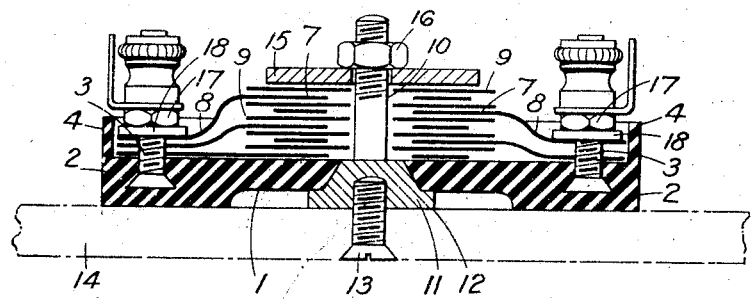

The invention is illustrated by way of example in the accompanying drawings:

Figure 1 of which is a plan view of one form of condenser constructed in accordance with the invention;

Figure 2 being a view thereof in sectional side elevation.

Referring now to the drawings, it will be seen that the condenser comprises a body portion 1 of vulcanite or other suitable material of substantially rectangular form, having two outwardly projecting arms or lugs 2 arranged on opposite sides thereof. The arms or lugs 2 are each adapted to receive a terminal post 3, the lower end of which is embedded in the arm or lug 2. The upper face of the body portion 1 and of the arms or lugs 2 is provided with a projecting flange or wall 4 so as to enclose a central circular recess 5 on the body portion 1 and two substantially rectangular recesses 6 on the lugs. Each of the condenser plates 7 is of substantially circular form corresponding to the recess 5 in the body portion 1, and is provided with a lug 8 conforming in shape to the recesses 6 on the lugs 2. The several condenser plates 7, which are preferably constructed of thin sheet copper, are interleaved with one another as shown in Figure 2, being separated by dielectric discs 9, which are preferably of mica.

The depth of the recess 5 is such as to accommodate any desired number of condenser plates 7 and dielectric discs 9 up to a predetermined number, dependent, of course, upon the capacity of the condenser which is required. A central opening is provided in each condenser plate 7 and in each dielectric disc 9 to accommodate a bolt 10 provided with a head 11 formed integral therewith and having a flange 12. The latter is adapted to engage with the recessed underside of the body portion 1, as clearly shown in Figure 2, and the head 11 is provided with a screw-threaded aperture to accommodate a screw 13 by means of which the condenser may be attached to a plate or panel indicated in dotted lines at 14.

The central opening in each of the condenser plates 7 is somewhat larger than the central opening in each of the dielectric discs 9, and the latter are somewhat larger in external diameter than the condenser plates 7 so that all risk of electric connection between adjacent condenser plates is avoided. Each of the lugs 8 on the condenser plates 7 is provided with an aperture to accommodate one or other of the posts 3, and after the requisite number of condenser plates 7 and dielectric discs 9 have been assembled in position, a bearing plate 15 is placed on the upper side of the upper dielectric disc, and the columns of condenser plates and dielectric discs are secured firmly in position by means of a nut 16 on the bolt 10. The lugs 8 on the several condenser plates 7 in each recess 6 are secured in electrical connection with one another by a nut 17 and washer 18.

It will be appreciated that the flange or wall 4 serves accurately to determine the position of the condenser plates 7 in the central recess 5, owing to the lugs 8 on these plates fitting closely within the recess 6 in the lugs 2, the flange or wall 4 also protecting the edges of the condenser plates and dielectric discs from injury or contact with other conductors.

By removing the nut 16 and bearing plate 15 the number of condenser plates can evidently be readily increased or diminished as desired by the addition or removal of condenser plates, so as correspondingly to vary the capacity of the condenser. Furthermore, owing to the positive clamping of the column of condenser plates and dielectric discs together, the capacity of the condenser for a given number of plates is accurately defined and constant.

It will be observed that the condenser may be attached to a plate or panel by means of a single securing screw as illustrated, although, if desired, the condenser may be otherwise mounted, with the primary object of facilitating the attachment of the condenser to its supporting plate or panel and thus avoiding the difficulties associated with the assembling of the parts when boring the supporting plate or panel for the purpose of securing the condenser in position thereon.

In place of a single bolt for securing the plates and dielectrics in position, a number of bolts may be provided, all of which will preferably pass through the base portion of the device.

From the above description it will be apparent that a very simple and rigid construction is provided and a variation in the number of elements employed may be readily obtained without damage to the plates or dielectrics and without necessarily removing the condenser from any instrument to which it may be attached.

It will be understood that the invention is not limited to the precise form of construction above described, and various modifications may be made in the form of the device without exceeding the scope of the invention.

Having now described my said invention, what I claim as new and desire to secure by Letters Patent, is:—

1. In an electrical condenser, the combination of a column of condenser plates interleaved with dielectrics and superposed upon one another, a body of insulating material having recesses therein, and lugs on each of said plates conforming in shape to the recesses in said body so as to center said plates relative to one another.

2. In an electrical condenser the combination of a column of condenser plates interleaved with dielectrics and superposed upon one another, a body of insulating material having recesses therein, a lug on each of said plates conforming in shape to the recesses in said body, a pair of terminals mounted upon said body, every alternate plate being connected by means of its lugs to one of said terminals and the remaining plates being connected by their lugs to the other of said terminals.

3. In an electrical condenser the combination of a column of superposed condenser plates interleaved with dielectrics, a body of insulating material having recesses therein, a lug on each of said plates conforming in shape to the recesses of said body, and a member for securing said column to said body extending through aligned apertures in said condenser plates and dielectrics.

4. In an electrical condenser the combination of a column of condenser plates interleaved with dielectrics and superposed upon one another, a body of insulating material having recesses therein, a terminal lug projecting from each of said condenser plates in substantially the plane thereof, and conforming in shape to one of the recesses in said body, and means secured to said body for clamping the plates and dielectrics of said column in intimate contact with one another.

5. In an electrical condenser the combination of a column of superposed circular condenser plates interleaved with dielectrics, a body of insulating material having recesses therein, a terminal lug projecting from each of said condenser plates, and conforming in shape to one of said recesses in said body, and means traversing central apertures in said plates and dielectrics for securing said column to said body.

6. In an electrical condenser the combination of a plurality of condenser plates, a plurality of dielectrics of greater lateral dimensions than said plates and interleaved with said plates, a body of insulating material, means constituted by a portion of said body for defining the position therein of said dielectrics, and means constituted by another portion of said body for defining the position therein of said plates.

In testimony whereof I have hereunto set my hand.

G. F. A. STONE.